United States Patent
Chen et al.

(10) Patent No.: US 9,438,415 B2
(45) Date of Patent: Sep. 6, 2016

(54) METHOD AND SYSTEM FOR SECURING COMMUNICATION ON A HOME GATEWAY IN AN IP CONTENT STREAMING SYSTEM

(75) Inventors: Xuemin Chen, Rancho Santa Fe, CA (US); Stephane Rodgers, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 800 days.

(21) Appl. No.: 13/171,148

(22) Filed: Jun. 28, 2011

(65) Prior Publication Data
US 2012/0216034 A1 Aug. 23, 2012

Related U.S. Application Data

(60) Provisional application No. 61/445,938, filed on Feb. 23, 2011.

(51) Int. Cl.
*H04L 9/08* (2006.01)
*H04L 29/06* (2006.01)

(52) U.S. Cl.
CPC ......... *H04L 9/0825* (2013.01); *H04L 63/0209* (2013.01); *H04L 63/0823* (2013.01); *H04L 2209/603* (2013.01)

(58) Field of Classification Search
USPC ........................................................ 713/153
See application file for complete search history.

(56) References Cited

U.S. PATENT DOCUMENTS

| | | | |
|---|---|---|---|
| 6,061,448 A * | 5/2000 | Smith et al. ................ 380/282 |
| 6,421,733 B1 | 7/2002 | Tso et al. |
| 6,871,193 B1 | 3/2005 | Campbell et al. |
| 7,107,462 B2 * | 9/2006 | Fransdonk ..................... 713/193 |
| 7,231,669 B2 * | 6/2007 | Leung et al. ................... 726/26 |
| 7,242,772 B1 * | 7/2007 | Tehranchi ..................... 380/223 |
| 2001/0047517 A1 | 11/2001 | Christopoulos et al. |
| 2002/0143972 A1 | 10/2002 | Christopoulos et al. |
| 2003/0142826 A1 | 7/2003 | Asano |
| 2005/0132264 A1 | 6/2005 | Joshi et al. |
| 2006/0005040 A1 | 1/2006 | Roberts |
| 2007/0028099 A1 | 2/2007 | Entin et al. |
| 2008/0168568 A1 | 7/2008 | Brodersen et al. |
| 2008/0267409 A1 | 10/2008 | Raike |
| 2010/0138903 A1 * | 6/2010 | Medvinsky ...................... 726/6 |
| 2011/0032856 A1 | 2/2011 | Ozawa |
| 2012/0216038 A1 | 8/2012 | Chen et al. |

\* cited by examiner

*Primary Examiner* — Tu Nguyen

(74) *Attorney, Agent, or Firm* — Sterne, Kessler, Goldstein & Fox PLLC

(57) ABSTRACT

A home gateway, which enables communication with a plurality of devices, recovers a root-content key from a key server of a service provider for secure delivery of content requested by a client device. The recovered root-content key is utilized to generate a content key for corresponding content scrambling. The home gateway communicates the scrambled content to the client device. The home gateway utilizes the RSA protocol to request the root-content key from the key server. The root-content key is recovered from the received key index. The content key is encrypted utilizing a public key and delivered to the client device. The key server distributes the public key to the gateway through authentication messages. The client device utilizes its own private key to recover the content key by decrypting the encrypted content key. The scrambled content from the home gateway is descrambled using the recovered content key for content consumption.

14 Claims, 10 Drawing Sheets

METHOD AND SYSTEM FOR SECURING COMMUNICATION ON A HOME GATEWAY IN AN IP CONTENT STREAMING SYSTEM

CLAIM OF PRIORITY

This patent application makes reference to, claims priority to and claims benefit from U.S. Provisional Application Ser. No. 61/445,938 which was filed on Feb. 23, 2011.

The above stated application is hereby incorporated herein by reference in its entirety.

CROSS-REFERENCE TO RELATED APPLICATIONS/INCORPORATION BY REFERENCE

This application also makes reference to: U.S. application Ser. No. 13/170,764 filed on Jun. 28, 2011.

The above stated application is hereby incorporated herein by reference in its entirety.

FIELD OF THE INVENTION

Certain embodiments of the invention relate to home gateways. More specifically, certain embodiments of the invention relate to a method and system for securing communication on a home gateway in an IP content streaming system.

BACKGROUND OF THE INVENTION

With the continuous growth of digital television or broadcast multimedia, and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs). Furthermore, most households may have one or more televisions that may be used to view television and/or multimedia broadcasts. Television broadcasts may include terrestrial TV, Cable-Television (CATV), satellite TV and/or Internet Protocol television (IPTV) based broadcasts. To ensure against unauthorized reception and/or use of TV and/or multimedia broadcast, service providers may require use of dedicated set-top boxes (STBs) that may be used to decrypt broadcast signals or provide conditional access to information communicated from the service providers to generate suitable video and/or audio streams that may be played via televisions and/or other display/playback devices in the household. Furthermore, STBs and/or TVs may support Internet access. Thus, rather than using a computer to access the Internet, a user may find it more convenient to use the flat screen televisions and/or monitors in homes for the same purpose. To do so, for example, an STB connected to a flat screen television may be provided with web browsing software and protocols, and Internet connectivity, which may enable the user to easily access the Internet or check their electronic mail (email), for example, from a convenient and comfortable location such as their living room.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for securing communication on a home gateway in an IP content streaming system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for securing communication on a home gateway in an IP content streaming system. In various embodiments of the invention, a home gateway enables communication with a plurality of client devices in a home network. The home gateway may be operable to recover a root-content key from a key server of a service provider to secure the delivery of the content requested by one of the plurality of client devices. In this regard, the home gateway may utilize the recovered root-content key to generate or create a content key corresponding to the requested content. The home gateway may utilize the generated content key for content scrambling on the content from the service provider. The home gateway may communicate the scrambled content to the client device for content consumption. In various embodiments of the invention, the home gateway may request the root-content key from the key server utilize a signed key exchange protocol such as the RSA protocol. The key server may generate the root-content key and pass the key index of the generated root-content key to the home gateway over the distribution networks. Upon receiving the key index from the key server, the home gateway may recover the root-content key through an embedded key table according to the received key index. The home gateway may generate the content key based on the recovered root-content key. The generated content key may be encrypted utilizing a public key received through authentication messages from the key server. The client device may recover the content key by decrypting the encrypted content key from the home gateway utilizing its own private key. Depending on system configuration, the client device may be operable to receive the encrypted content key and/or the public key through authentication messages from the key server when needed. The client device may utilize the recovered content key to descramble the scrambled content from the home gateway for content consumption.

Figure 1:
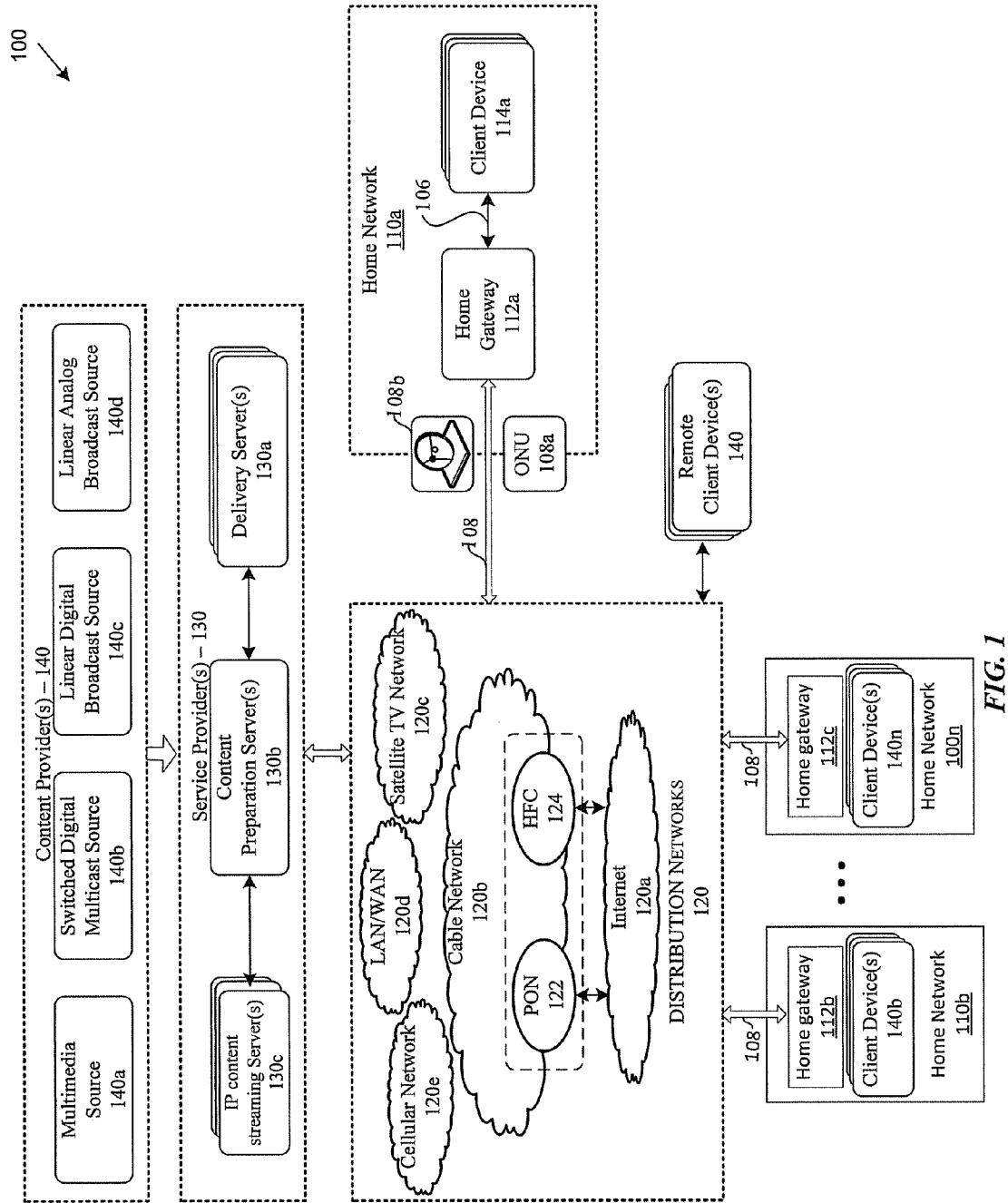
FIG. 1 is a block diagram illustrating an exemplary communication system that comprises a home network serviced by a home gateway, in accordance with an embodiment of the invention.

FIG. 1 is a block diagram illustrating an exemplary communication system that comprises a home network serviced by a home gateway, in accordance with an embodiment of the invention. Referring to FIG. 1, there is shown a communication system 100. The communication system 100 comprises a plurality of home networks 110, of which home networks 110a-110n are displayed, a plurality of distribution networks 120, one or more service providers 130, and one or more content providers 140.

The home networks 110a-110n may be serviced by the home gateways 112a-112n, respectively. A home gateway such as the home gateway 112a may correspond to a location that may comprise a plurality of client devices which may be serviced and/or managed by the home gateway 112a. In this regard, the location may comprise a residence (e.g., home, apartment), a small business, a school, a library, and/or other like settings in which users may want to obtain access to service and/or to content provider networks. The home gateway 112a may comprise suitable logic, circuitry, interfaces, and/or code that may be operable to provide connectivity between one or more client devices 114a in the home network 110a and a plurality of external networks. For example, the home gateway 112a may handle various connections 108 to the distribution networks 120. The connections 108 may comprise wired, optical, and/or wireless connections between the home gateway 112a and the distribution networks 120, which may enable communication between the home gateway 112a and the service providers 130. The home gateway 112a may operate as an interface device that may allow one or more service and/or content providers to interact with various devices in the home network 110a. In this regard, the home gateway 112a may be operable to perform and/or provide various services that may pertain to enabling and/or facilitating reception of content from one or more content providers, wherein the content may be delivered through one or more services providers. For example, the home gateway 112a may be operable to perform such operations as network access related processing (e.g., PHY/MAC, transport layer processing), encryption and/or decryption, user and/or account authentication, and/or at least some of video and/or audio processing operations that may be needed for consumption of multimedia content. The home gateway 112a may communicate with various client devices 114a in the home network 110a, using wired and/or wireless communication links. The home gateway 112a may comprise a set-top box (STB), a broadband gateway, and/or an Internet Protocol Television (IPTV) gateway.

The home gateway 112a may be operable to handle multiple connections 108 to multiple ones, or portions, of the distribution networks 120, where different ones or portions of the distribution network(s) 120 are owned, operated, leased, or otherwise associated with different network access service providers 130. For example, a first network access service provider 130 may provide network access to the home gateway 112a via a DSL connection over twisted-pair cabling, and a second network access service provider 130 may provide network access to the home gateway 112a via a cable television connection over coaxial cabling. In some instances, the home gateway 112a may be operable to concurrently communicate over multiple connections provided by multiple network access service providers.

Devices serviced by, and/or connected with the home gateway 112a may comprise content consuming devices and/or other, non-content consuming household or home devices that may be operable to interact with the home gateway 112a. For example, the home gateway 112a may service, and/or may communicate with a plurality of client devices 104a in the home network 110a. The client devices 104a may comprise, for example, one or more of a television, a laptop computer, a mobile phone, and a digital video recorder (DVR) or personal video recorder (PVR). The home gateway 112a may interact with each of the client devices 104a via corresponding links, which may be supported by the home gateway 112a and the corresponding client devices 104a. For example, the links between the home gateway 112a and the client devices 104a may comprise a High-Definition Multimedia Interface (HDMI) cable, 60 GHz WiGig wireless connection/interface, a wired Ethernet link, a wireless Ethernet link, a Universal Serial Bus (USB) link, an IEEE 1394 link, and/or a two-wire link or a wireless link.

Although the client devices 104a may communicate only with the home gateway 112a as shown in FIG. 1, the invention may not be so limited. Accordingly, the client devices 104a may communicate with multiple home gateways in one or more local or home networks without departing from the spirit and scope of various embodiments of the invention.

As illustrated in FIG. 1, the plurality of home networks 110b, . . . , 110n, may also be connected to the distribution networks 120. These home networks 110b, . . . , 110n may operate in substantially the same manner as the home network 110a. By having multiple home networks connected to the distribution networks 120, various applications, such as peer-to-peer communication and/or data aggregation operations may be possible by utilizing the home gateways 112a-112n in the home networks 110a-110n.

The plurality of distribution networks 120 may comprise one or more networks that may be operable to enable wireless and/or wired communication among a plurality of entities based on one or more networking and/or communication infrastructures. In this regard, the plurality of distribution networks 120 may be utilized to enable distributing multimedia content generated by the content providers 140, directly and/or via the service providers 130, to end-users.

The network connectivity available via the plurality of distribution networks 120 may be based on one or more communication standards and/or protocols. The plurality of distribution networks 120 may comprise, for example, the Internet 120a, a cable network 120b, a satellite television (TV) network 120c, a wireless local area network/wide area network (LAN/WAN) 120d, and/or a cellular network 120e.

The Internet 120a may comprise a system of interconnected networks to enable exchange of data between a plurality of nodes, based on one or more networking standards, including, for example, the Internet Protocol (IP). For example, the Internet 120a may enable connectivity among a plurality of private and public, academic, business, and/or government nodes and/or networks. The physical connectivity may be provided in the Internet 120a via, for example, the Public Switched Telephone Network (PSTN), copper wires, fiber-optic cables, wireless interfaces, and/or other protocols and/or standards-based interfaces. The transport functionality may be performed in the Internet 120a based on, for example, one or more protocols, such as the Transmission Control Protocol/IP (TCP/IP), for example.

The cable network 120b may comprise suitable distribution nodes, systems, and/or subnetworks that may enable forwarding of communication between cable providers and a plurality of cable consumers. For example, the cable network 120b may comprise a network of fiber optics and/or coaxial cables for use in cable broadcasts. In addition to traditional coaxial based networks, the cable network 120b may comprise one or more passive optical networks (PON) 122 and/or one or more hybrid fiber-coax (HFC) networks 124. In this regard, receiving optical signals, via the PON 122 and/or the HFC 124, may require use of dedicated devices such as an optical network unit (ONU) 108a at the home network 110a. The ONU 108a may comprise suitable logic, circuitry, interfaces, and/or code that may be operable to terminate fiber connections to facilitate receiving of incoming optical signals. The ONU 108a may be operable to transform the received optical signals into electrical signals, which may be further processed within the home network 110a via the home gateway 112a to recover multimedia content carried thereby.

The satellite TV network 120c may comprise suitable distribution nodes, systems, and/or subnetworks that may enable communication of satellite TV broadcast by satellite TV providers to a plurality of consumers. For example, the satellite network 120c may comprise a plurality of orbiting satellite nodes and/or one or more terrestrial centers in a satellite-TV system. In this regard, receiving satellite signals may require use of dedicate devices such as satellite receiver 108b at the home network 110a. The satellite receiver 108b may comprise suitable logic, circuitry, interfaces, and/or code that may be operable to receive incoming satellite signals. The received satellite signals may be further processed within the home network 110a via the home gateway 112a to recover multimedia content carried thereby.

The LAN/WAN network 120d may comprise suitable logic, circuitry, interfaces, and/or code that may be operable to enable implementation of one or more wired and/or wireless LAN or WAN standards and/or protocols. Exemplary WAN technologies comprise, for example, WiMAX-based networks. Exemplary LAN technologies may comprise, for example, those based on IEEE 802.11 standards, including, for example, WiFi-based networks.

The cellular network 120e may comprise suitable logic, circuitry, interfaces and/or code that may be operable to enable communication via one or more cellular technologies. Exemplary cellular technologies may comprise Code Division Multiple Access (CDMA), wideband CDMA (WCDMA), CDMA1000, High-Speed Downlink Packet Access (HSDPA), Global System for Mobile Communications (GSM), General Packet Radio Services (GPRS), Enhanced Data Rates for Global Evolution (EDGE), and/or Universal Mobile Telecommunication System (UMTS). The cellular network 120e may comprise, for example, a plurality of control and/or switching nodes, and a plurality of base stations that enable transmission and/or reception of cellular based communications between the cellular network 110e and cellular capable devices.

The service providers 130 may comprise various entities which may provide various services using different access technologies to, the client devices 114a, for example, via the home gateway 112a and/or to the home gateway 112a itself. The services may include, but are not limited to, multimedia, television, Internet, phone, Ethernet, multimedia over coax alliance (MoCA), passive optical network (PON), and/or cellular services, for example. Some of the service providers 130 may comprise network access service providers which provide physical layer connections to the home gateway 112a. Such physical layer connections may then be utilized to access, and/or may be part of, the distribution networks 120. In this regard, "network access service provider" as utilized herein, is distinguished from the more generic term "service provider" which may encompass services other than providing physical layer access to a network. Cable television providers, plain old telephone service (POTS) providers, digital subscriber line (DSL) providers, cellular providers, WiMAX providers, and satellite providers are examples of network access service providers.

The service providers 130 may comprise one or more delivery servers 130a, one or more content preparation servers 130b, and/or one or more IP content streaming servers 130c. The delivery servers 130a may comprise suitable logic, circuitry, interfaces, and/or code that may be operable to perform various processing and/or interfacing functions pertaining to one or more delivery infrastructures such as, for example, cable or satellite based infrastructures, supported by the service provider 130 for content delivery. The delivery server 130a may perform functions such as, for example, session resource management, conditional access management, packet processing, transport processing, and/or transmission or reception related operations, such like signal modulation and/or physical layer signal generation and/or reception.

The content preparation server 130b may comprise suitable logic, circuitry, interfaces, and/or code that may be operable to prepare content to be delivered via the service provider 130. In this regard, the content preparation server 130b may process content received from the content providers 140. The content preparation server 130b may configure or select content delivery for the processed content based on the type of delivery infrastructure being utilized.

The IP content streaming server 130c may comprise suitable logic, circuitry, interfaces, and/or code that may be operable to perform various functions pertaining to supporting IP content streaming by the service provider 130. Exemplary functions may comprise web server (e.g. HTTP server) related functions, and content protection functions such as encryption key generation.

The content providers 140 may generate, capture, and/or package content that may be distributed to end-users via the service providers 130 and/or the distribution networks 120. The content may comprise audio, video, multimedia, e-book, gaming, and/or other content. The delivered content may comprise commercial content, such as content generated by film or television production and/or distribution companies (e.g. Paramount Pictures or Warner Bros.), and/or personal content, such as user-generated content. The content may be, for example, downloadable and/or streaming, rented and/or purchased. Content originating from the content providers 140 may be distributed to the end-users (e.g. consumers) by the service providers 130. The content providers 140 may comprise various content sources such as, for example, multimedia content sources 140a, linear analog broadcast sources 140b, linear digital broadcast sources 140c, and/or switched digital multicast sources 140d. In this regard, the multimedia content sources 140a may refer to content resources providing content to be delivered via IP content streaming. Content resources such as the linear analog broadcast sources 140b, the linear digital broadcast sources 140c, and/or the switched digital multicast sources 140d may be utilized in conjunction with traditional broadcast and/or delivery infrastructures via terrestrial, cable, and/or satellite based systems.

In operation, the home gateway 112a may be configured to serve the client devices 140a in the home network 112a. In various exemplary embodiments of the invention, the home gateway 112a may be utilized as a content server for content distribution or content delivery to the client devices 114a in the home network 110a. The home gateway 112a may communicate with the content providers 140 and/or the service providers 130 over the distribution networks 120 for the content requested by the client devices 114a. In this regard, the home gateway 110a may prepare and/or format the content from the content providers 140 and/or the service providers 130 suitable for the specific client device(s) 114a. For example, the home gateway 112a may format the same content from the distribution networks 120 differently during IP content streaming for content consumption by different types of client devices such as an Apple tablet, Android based smartphone, a MS-Windows based laptop, and/or a high-definition television (HDTV). The home gateway 112a may distribute or deliver the formatted content to the client devices 114a for consumption. In this regard, the home gateway 112a may utilize various content delivery techniques or services such as cable delivery services, satellite delivery services, and/or IP content streaming services, to support corresponding content delivery.

Figure 2:
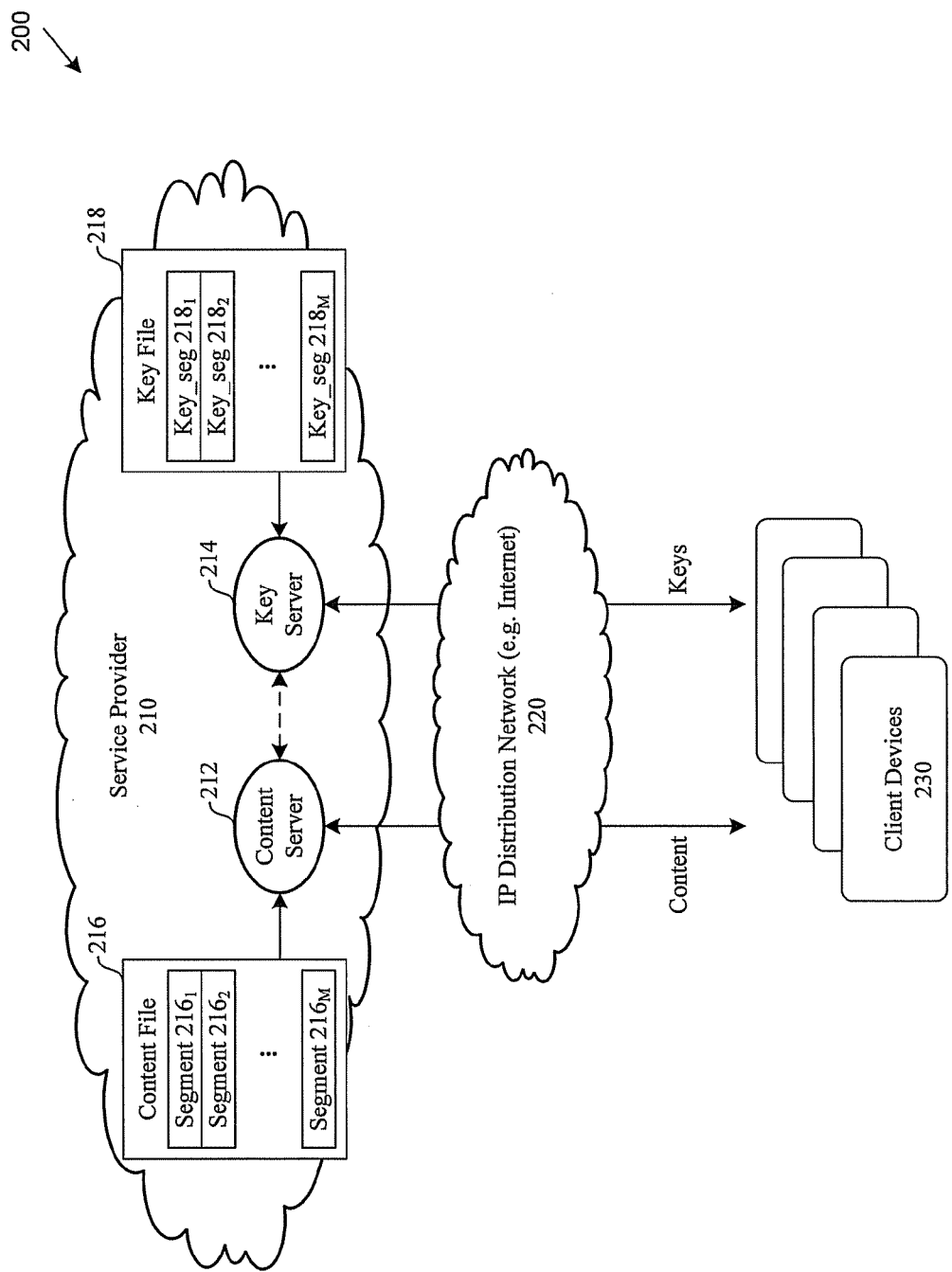
FIG. 2 is a block diagram illustrating an exemplary communication system that secures content delivery by using segment keys in IP content streaming, in accordance with an embodiment of the invention.

FIG. 2 is a block diagram illustrating an exemplary communication system that is operable to secure content delivery using segment keys in IP content streaming, in accordance with an embodiment of the invention. Referring to FIG. 2, there is shown a communication system 200 comprising a service provider 210, an IP distribution network 220, and a plurality of client devices 230.

The service provider 210 may provide content via IP content streaming to a plurality of client devices such as the client devices 230, which may be associated with the same home network or with different home networks. The service provider 210 may, similar to the service providers 130 of FIG. 1, support various services such as IP content streaming. The service provider 210 may comprise a content server 212 and a key server 214. The content server 212 may comprise suitable logic, circuitry, interfaces, and/or code that may be operable to process content from the content providers 140 for content delivery to the client devices 230. In this regard, the content server 212 may incorporate or utilize various content processing techniques to secure or protect the content delivery against unwanted access. For example, the content server 212 may segment the content into a plurality of content segments, each of which being accessible using a unique key from the key server 214.

The key server 214 may comprise suitable logic, circuitry, interfaces, and/or code that may be operable to generate keys for content and/or content segments. A key refers to a string of bits used by a cryptographic algorithm to encrypt or decrypt content or data. In an exemplary embodiment of the invention, the key server 214 may utilize a public-private key pair for encryption and decryption of content. In addition, various key-exchange protocols such as the Rivest, Shamir and Adleman (RSA) protocol may be utilized for key exchange. In this regard, the RSA protocol may be signed in both directions during key delivery or exchange. A public-private key pair may comprise a public key and a private key. A public key is a freely available key and may be known to anyone, whereas a private key is created for a specific user and is not exposed to others. A public key may be utilized for encryption of content or data. A private key, however, may be utilized for decryption of encrypted content or data. In this regard, the key server 214 may be operable to provide key control and/or key management related functions to keep a private key secret. For example, the key server 214 may maintain a separate private key for each client device. In an embodiment of the invention, the key server 214 may provide a key index for a root-key created for a specific client device 230 to an associated home gateway 112a that serves the specific client device 230, but not to the specific client device 230 itself.

In operation, the service provider 210 may be configured to secure content delivery to the client devices 230 during IP content streaming. For example, the service provider 210 may be operable to segment the content 216 via the content server 212 into a plurality of content segments $216_1$-$216_M$. The key server 214 may generate a unique (segment) content key for each of the content segments $216_1$-$216_M$. The content segments $216_1$-$216_M$ may be encrypted and may be provided to the client devices 230 over the IP distribution network 220. The service provider 210 may provide key indexes of the segment keys $208_1$-$208_M$ to the home gateway 112a that serves the client devices 230.

Figure 3:
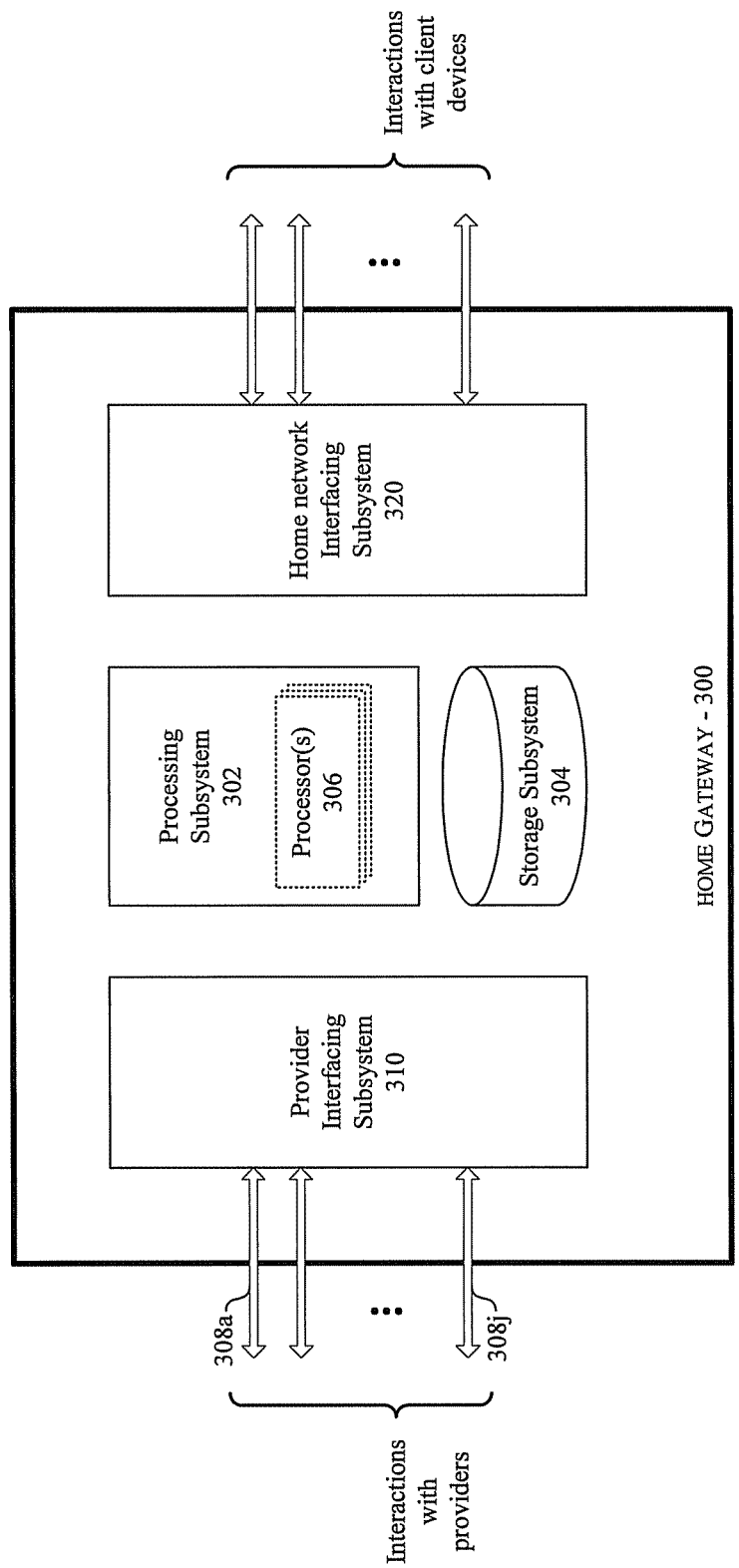
FIG. 3 is a block diagram illustrating an exemplary home gateway that is operable to secure communication in an IP content streaming system, in accordance with an embodiment of the invention.

FIG. 3 is a block diagram illustrating an exemplary home gateway that is operable to secure communication in an IP content streaming system, in accordance with an embodiment of the invention. Referring to FIG. 3, there is shown a home gateway 300, which may correspond to the home gateway 112a of FIG. 1.

The home gateway 300 may comprise a processing subsystem 302, a storage subsystem 304, a provider interfacing subsystem 310, and a client interfacing subsystem 320. In some instances, the home gateway 300 may be such that the various components listed above may be distributed or located over multiple devices. Moreover, the components listed above are provided by way of illustration and not of limitation. Other configurations and/or architectures of the home gateway 300 may be implemented without departing from the spirit and scope of various embodiments of the invention.

The processing subsystem 302 may comprise suitable logic, circuitry, interfaces, and/or code that may be operable to configure and/or control operations of various components and/or subsystems of the home gateway 300, and/or other devices managed by and/or connected to the home gateway 300, by utilizing, for example, one or more control signals. The processing subsystem 302 may comprise one or more processors 306, which may be general processors and/or various specialized processors such as video processors, audio processors, and/or security processors. While the processing subsystem 302 is shown herein as a single block, the invention needs not be so limited. Accordingly, in instances where the home gateway 300 is implemented on a distributed platform, some of the operations and/or functions described herein with regard to the processing subsystem 302 may be performed by components that may be located in different devices.

The storage subsystem 304 may comprise suitable logic, circuitry, interfaces, and/or code that may be operable to store data that may be utilized for the operations of the home gateway 300. For example, the storage subsystem 304 may be utilized to store configuration data, parameters, client device information, client tracking and/or monitoring information, security information, and intermediate processing data. The storage subsystem 304 may comprise one or more memory devices that may enable permanent and/or non-permanent storage, buffering, and/or fetching of data, code and/or other information which may be used, consumed, and/or handled in the home gateway 300. The storage subsystem 304 may comprise storage media integrated in the home gateway 300 and/or one or more removable storage devices. In this regard, the storage subsystem 304 may comprise different memory technologies, including, for example, read-only memory (ROM), random access memory (RAM), Flash memory, solid-state drives (SSDs), and/or field-programmable gate arrays (FPGAs).

The provider interfacing subsystem 310 may comprise suitable logic, circuitry, code, and/or interfaces that may be operable to receive data from and/or send data to one or more service/content providers via one or more connections 308a-308j to one or more service or content providers. The provider interfacing subsystem 310 may be operable to support various communication protocols, standards, and/or data transport technologies. In this regard, each of the connections 308a-308j may utilize different physical media and/or different physical layer protocols. For example, the connection 308a may comprise a DSL over twisted-pair connection whereas and the connection 308j may comprise a CATV over coaxial cable connection. Accordingly, the provider interfacing subsystem 310 may enable accessing and/or communicating with one or more service providers 130 and/or content providers 140, via the distribution networks 120. The provider interfacing subsystem 310 may also be utilized to communicate data to and/or from third parties. In this regard, the provider interfacing subsystem 310 may enable gateway-to-gateway communication and/or interactions between the home gateway 300 and communication devices located outside the home network 110a, directly and/or indirectly through the distribution networks 120 corresponding to one or more service providers. The provider interfacing subsystem 310 may enable concurrently communicating with multiple and/or different service/content providers and/or devices.

The home network interfacing subsystem 320 may comprise suitable logic, circuitry, code, and/or interfaces that may be operable to receive data from and/or send data to one or more devices in the home network 110a, for example. The home network interfacing subsystem 320 may be operable to support multiple communication protocols, standards, and/or data transport technologies. In this regard, the home network interfacing subsystem 320 may handle one or more connections to one or more client devices 114a. For example, the home network interfacing subsystem 320 may comprise, one or more wired and/or wireless Ethernet interfaces, one or more analog and/or digital audio outputs, one or more audio/video interfaces such as such as HDMI and DisplayPort, 60 GHz WiGig wireless connection/interface, one or more USB interfaces, one or more IEEE 1394, and/or one or more telephone jacks.

In operation, the home gateway 300 may be configured to provide connectivity between service and/or content providers and the client devices 114a in the home network 110a. For example, the home gateway 300 may communicate with one or more service providers 130 via the provider interfacing subsystem 310, to facilitate transmitting requests to, and/or receiving content or data from the service providers 130, via the distribution networks 120. The home gateway 300 may be operable to communicate with the client devices 114a in the home network 110a via the home network interfacing subsystem 320. The home gateway 300 may be operable to distribute the content to one or more client devices 112a for content consumption. In this regard, the home gateway 300 may utilize the processing subsystem 302 to process the content obtained from the service providers 130 and/or the content providers 140. The processed content may then be communicated to the client devices 114a via the home network interfacing subsystem 320.

Figure 4:
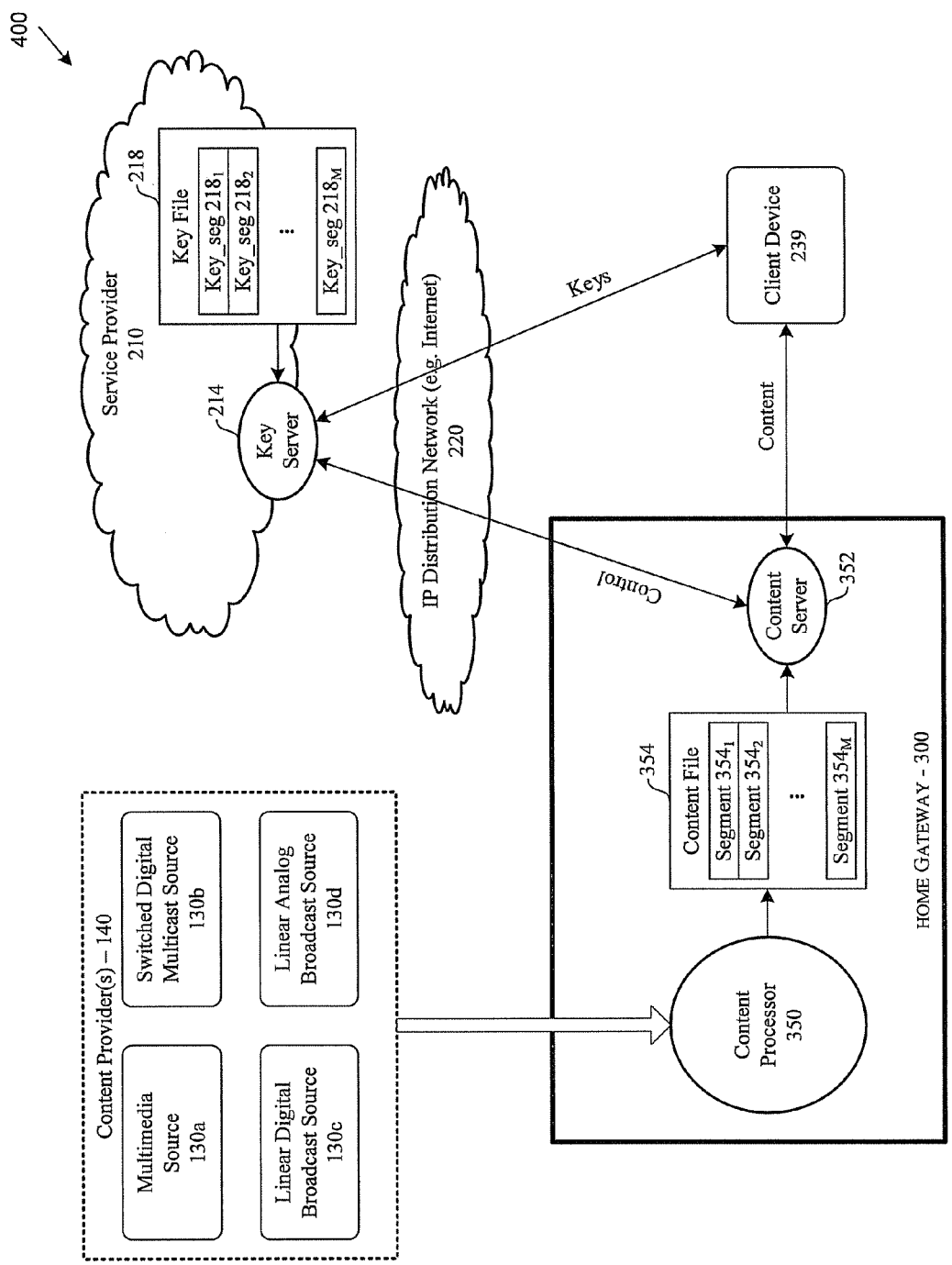
FIG. 4 is a block diagram illustrating an exemplary home gateway that operates as a content server for content delivery in an IP content streaming system, in accordance with an embodiment of the invention.

FIG. 4 is a block diagram illustrating an exemplary home gateway that operates as a content server for content delivery in an IP content streaming system, in accordance with an embodiment of the invention. Referring to FIG. 4, there is shown a communication system 400 comprising the home gateway 300 of FIG. 3, content providers 140 of FIG. 1, a service provider 210, an IP distribution network 220, and a client device 230 of FIG. 2.

The service provider 210 may support IP content streaming to a plurality of client devices such as the client device 230. In this regard, the service provider 210 may be operable to secure content access during IP content streaming services. For example, the service provider 210 may segment content for delivery into a plurality of content segments, each of which being accessible through a unique key from the key server 214.

The content providers 140 may provide content from content sources corresponding to various content distribution schemes.

The home gateway 300 may support various IP content streaming protocols and/or formats, for example, MPEG dynamic adaptive streaming over HTTP (DASH), HTTP live streaming (HLS), and/or Internet Information Services (IIS) Smooth Streaming. The home gateway 300 may comprise a content processor 350 and a content server 352 to support IP content streaming services.

The content processor 350 may comprise suitable logic, circuitry, code, and/or interfaces that may be operable to process content from the content providers, and format the processed content for a particular client device such as the client device 230. The content processor 350 may utilize various content processing mechanisms to secure content delivery. For example, the content processor 350 may segment the content 354 from the content providers 140 into the content segments $354_1$-$354_M$. In another example, the content processor 350 may perform transcypting on the content to change and/or modify the encryption of a digital media file. The content processor 350 may perform content transcoding so as to convert the content from legacy data format to an IP content streaming format, for example.

The content server 352 may comprise suitable logic, circuitry, code, and/or interfaces that may be operable to process and/or manage content delivery via the home gateway 300 to the client devices 230. The content server 352 may communicate with the key server 214 for keys to allow content encryption. The content server 352 may manage and/or control the operation of the content processor 350 to prepare content for delivery to the client device 230.

In operation, the home gateway 300 may search for the content sources suitable for the content requested by the client device 230. The home gateway 300 may determine or select the content sources based on content quality, cost, and/or time for content consumption, for example. The content processor 350 may process content from the selected content sources. The content processor 350 may format the content appropriately for use by the specific client device 230. In this regard, the content processor 350 may be configured to format the content based on device capabilities and/or device types. For example, for the client device 230 comprising an Apple iPad tablet, the content processor 350 may covert the content, requested by the client device 230, into a format suitable for use by Apple based devices. The content processor 350 may be operable to segment the content into the content segments $354_1$-$354_M$ in order to secure content delivery. The content server 352 may request keys from the key server 214. The content server 352 may derive content keys based on the keys from the key server 214 for content encryption. In this regard, the content segments $354_1$-$354_M$ may be encrypted utilizing corresponding content keys. The content server 352 may provide the encrypted content segments to the client device 230. The client device 230 may request content keys from the home gateway 300 for content decryption. The content server 352 may encrypt the content keys to securely deliver to the client device 230 via the home gateway 300. The client device 230 may recover the content keys and may subsequently decrypt the received encrypted content segments utilizing the corresponding recovered content keys from the content server 352.

Figure 5:
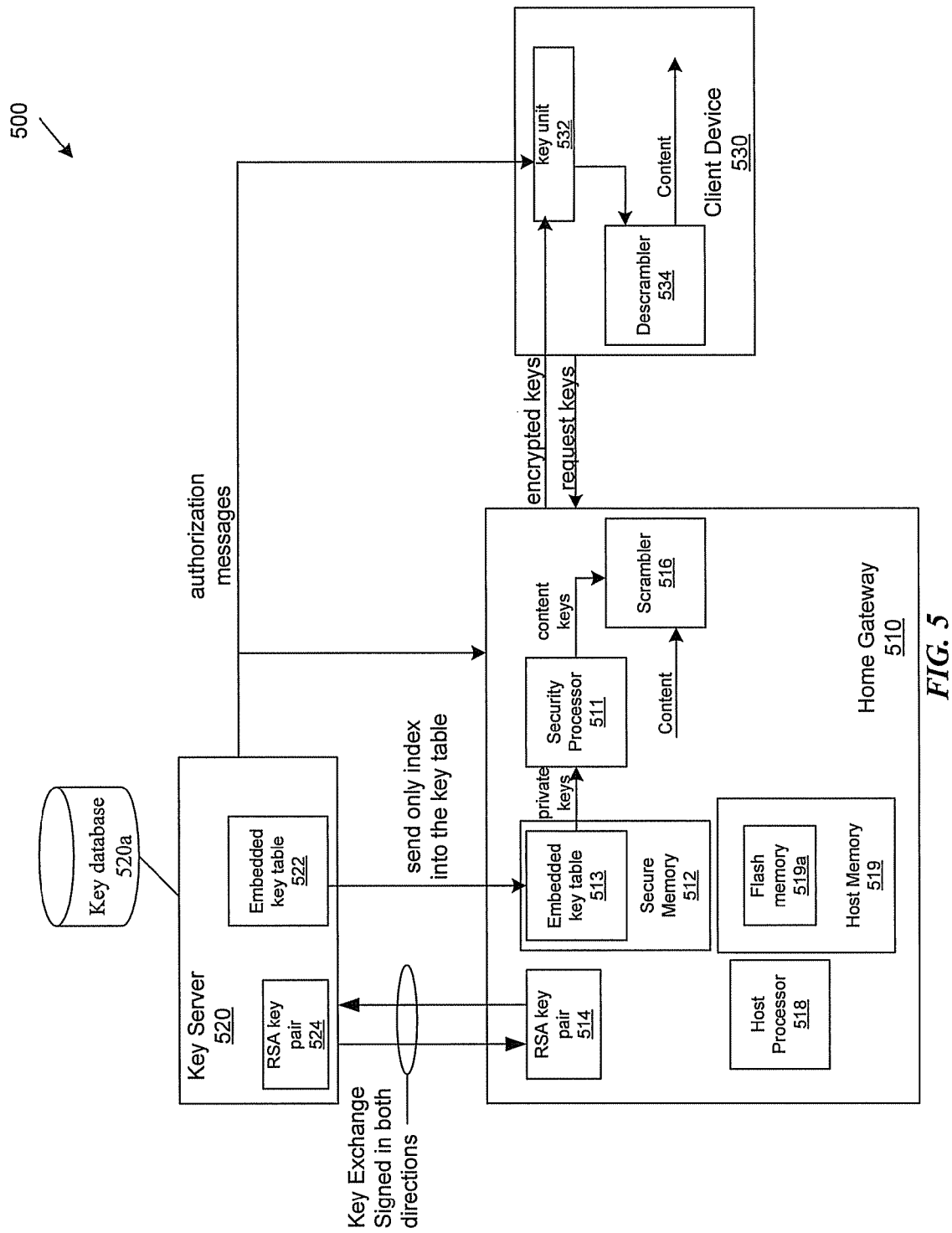
FIG. 5 is a block diagram illustrating an exemplary key exchange procedure that is performed to secure communication on a home gateway in an IP content streaming system, in accordance with an embodiment of the invention.

FIG. 5 is a block diagram illustrating an exemplary key exchange procedure that is performed to secure communication on a home gateway in an IP content streaming system, in accordance with an embodiment of the invention. Referring to FIG. 5, there is shown a communication system 500 comprising a home gateway 510, a key server 520, and a client device 530.

The home gateway 510 may be similar to the home gateway 300 of FIG. 4. In addition, the home gateway 510 may comprise a security processor 511, a secure memory 512, a RSA key pair 514, a scrambler 516, a host processor 518 and a host memory 519.

The security processor 511 may comprise suitable logic, circuitry, code, and/or interfaces that may be operable to manage the keys and certificates for the home gateway 510. The security processor 511 may be fully-integrated, high performance cryptographic processor capable of performing various security protocols such as IPsec (3DES/AES, HMAC-SHA-1/HMAC-MD5) system throughput. The security processor 511 may be communicatively coupled to the secure memory 519a. The secure memory 519a may comprise suitable logic, circuitry, interfaces and/or code that may enable storage of authenticated variables, keys and certificates for secure communication on the home gateway 510. The secure memory 519a may be inaccessible to the firmware and other host processor applications without risk of tampering by malicious code executing on the host processor 518. In various embodiments of the invention, the home gateway 510 may comprise an embedded key table 513 to store a list of keys such as internal symmetric keys. In an exemplary embodiment of the invention, the list of keys stored in the embedded key table 513 may comprise keys that may never be exposed to third parties. The embedded key table 513 may be indexed or sorted utilizing corresponding key indexes. In an exemplary embodiment of the invention, the embedded key table 513 may be securely stored in the secure memory 519a. In another embodiment of the invention, the embedded key table 513 may be stored in a secure area of a flash memory 519 in the host memory 519. The secure area of the flash memory may be inaccessible to the host processor 518. The home gateway 510 may be configured to partition the host memory 519 such that the secure area in the flash memory 519a may allow access only to the security processor 511.

In various embodiments of the invention, the security processor 511 may support various cryptographic algorithms such as asymmetric-key algorithms, symmetric-key algorithms and public-key algorithms utilized for content encryption and decryption processes. The widely adopted key algorithms by the industry include Data Encryption Standard (DES), Triple DES (3DES), RC4, RC5, and Advanced Encryption Standard (AES). Examples of public-key algorithms include RSA, Digital Signature Algorithms (DSA), and Elliptic Curve Cryptography (ECC). In an embodiment of the invention, the security processor 511 may communicate with the key server 520 for key exchange. In this regard, the security processor 511 may utilize a RSA public-private key pair 514 to ensure that the key exchange may be signed in both directions during the key exchange. In an embodiment of the invention, the security processor 511 may receive key indexes of root-content keys from the key server 520. The security processor 511 may retrieve the root-content keys from the embedded key table 513 utilizing the received corresponding key indexes. In an embodiment of the invention, the security processor 511 may be operable to generate or create content keys from the retrieved root-content keys. With segmentation-based content processing, the security processor 511 may generate a plurality of segment content keys for content encryption. The security processor 511 may provide the content keys to the scrambler 516 for content scrambling. The security processor 511 may also provide the content keys to the client device 530 for content descrambling. In this regard, the security processor 511 may communicate with the key server 520 for authorization messages. In an embodiment of invention, the authorization messages from the key server 520 may comprise public keys for the client device 530. The security processor 511 may utilize the public keys from the key server 520 to encrypt the content keys before delivering the content keys to the client device 530. The encrypted content keys may be communicated to the client device 530 if requested by the client device 530. The content keys may be unique to a specific client device such as the client device 530, and may be changed periodically to increase security.

The scrambler 516 may comprise suitable logic, circuitry, code, and/or interfaces that may be operable to perform content scrambling. In this regard, the scrambler 516 may utilize content keys from the security processor 511 to scramble the content from the content processor 350. With segment-based content process, the scrambler 516 may utilize corresponding content segment keys for content segment scrambling. The scrambler 516 may utilize various scrambling algorithms such as Arnold transform and M-sequence transform for content scrambling. The resulting scrambled content may be delivered to the client device 530 for content consumption.

The host processor 518 may comprise suitable logic, circuitry, interfaces and/or code that may be operable to perform a variety of signal processing tasks associated with the home gateway 510. The host processor 518 may be operable to control or coordinate operations of associated components such as the security processor 511 and the scrambler 516. For example, the host processor 518 may be operable to coordinate and/or synchronize the generation of the plurality of content segment keys $344_1$-$344_M$ to enable retrieving the content keys for use during segment encryption, and/or to enable providing the retrieved content keys to the client device 530 for use during content segment decryption operations performed there. The host processor 518 may be enabled to communicate the encrypted or scrambled content from the scrambler 516 to the client device 530 via the home network interfacing subsystem 320.

The key server 520, which may be substantially similar to key server 214 of FIG. 2. The key server 520 may be operable, however, to support secure content access over the home gateway 510 during IP content streaming services. In this regard, the key server 520 may support a RSA (public-private) key pair 524 such that the RSA protocol may be signed in both directions of the key exchange. In an exemplary embodiment of the invention, the key server 520 may authorize or deny the client device 530 and an associated home gateway 510 to recover content keys for access content of a service from the service providers 130. In this regard, the key server 520 may verify credentials such as IDs of the client device 530 and the associated home gateway 510 to secure content delivery. For example, in instances where the key server 520 detects that multiple client devices with the same client IDs are requesting authorization from the key server 520, the key server 520 may consider the multiple client devices with the same client IDs are clone client devices. In an exemplary embodiment of the invention, the key server 520 may deny the client authorization requests from the clone client devices. At the same time, the key server 520 may request the associated home gateways 510 to remove the clone client devices from the service or network.

In various embodiments of the invention, the key server 520 may comprise an embedded key table 522 to store a list of keys such as internal symmetric keys for the key server 520. The embedded key table 522 may be indexed or sorted utilizing corresponding key indexes. In an exemplary embodiment of the invention, the key server 520 may determine or generate root-content keys for secure content delivery over the home gateway 510. The key server 520 may identify key indexes of the root-content keys from the embedded key table 522. The key server 520 may retrieve corresponding public keys for the client devices 230 from an on-site database such as the key database 520*a*. The key server 520 may sign or communicate the retrieved public keys together with the root-content keys to the home gateway 510 for the client devices 230. In this regard, the identified key indexes of the root-content keys may be provided or delivered to the home gateway 510 for content protection. The key server 520 may provide authorization messages to the home gateway 510 for the client device 530. In another embodiment of the invention, the key server 522 may embed the retrieved public keys or common keys into the authorization messages. The embedded public keys may be utilized by the home gateway 510 to encrypt the content keys for key distribution to the client device 530. Alternatively, in another embodiment of the invention, the key server 520 may determine the content key from the root-content key. The key server 520 may encrypt the content keys utilizing the retrieved public keys for the client device 530. The key server 522 may embed the encrypted content keys into the authorization messages and may communicate or provide the authorization messages to the client device 530. The encrypted content keys may be decrypted or recovered by the client device 530 utilizing its own private keys.

The client device 530 is substantially similar to the client device 230 of FIG. 2. In various embodiments of the invention, the client device 530 may request authorization from the key server 520 whenever connecting to a specific home gateway such as the home gateway 510. After authenticated by the key server 520, the client device 530 may utilize its private key to recover content keys from the home gateway 510 and/or from the key server 520. The client device 530 may utilize the recovered content keys to descramble the scrambled content via the descrambler 534 for content consumption.

The descrambler 534 may comprise suitable logic, circuitry, code, and/or interfaces that may be operable to perform content descrambling. In this regard, the descrambler 534 may utilize the recovered content keys from the key unit 532 to descramble the content from the home gateway 510. The descrambler 534 may support various descrambling algorithms such as Arnold transform and M-sequence transform for content descrambling.

In operation, the client device 530 and the home gateway 510 may request authentication from the key server 520 to communicate content of a service provided by the service providers 130 to the client device 530 via the home gateway 510. Upon authenticated by the key server 520, the home gateway 510 may acquire and process the content from the content providers 140 via the content processor 350. The processed content may be provided to the scrambler 516 for content scrambling. In various embodiments of the invention, the home gateway 510 may communicate with the key server 520 to request content keys from the key server 520 for the client device 530. The key server 520 may identify key indexes from the embedded key table 522 for the root-content keys and may provide the identified key indexes of the root-content keys to the home gateway 510. The home gateway 510 may recover the root-content keys utilizing the embedded key table 512 based on the received corresponding key indexes. The recovered root-content keys may be utilized by the security processor 511 to create or generate content keys for the requested content. The security processor 511 may forward the content keys to the scrambler 516 for scrambling the requested content from the content processor 350. The resulting scrambled content may be provided to the client device 530. In various embodiment of the invention, the client device 530 may request content keys to decrypt the received scrambled content from the gateway 510. The key unit 532 in the client device 530 may utilize the private keys of the client device 530 to descript the encrypted content keys from the home gateway 510 or from the key server 520. The decrypted content keys may be utilized by the descrambler 534 for content descrambling. The resulting descrambled content may be utilized by the client device 530 for content consumption.

Figure 6:
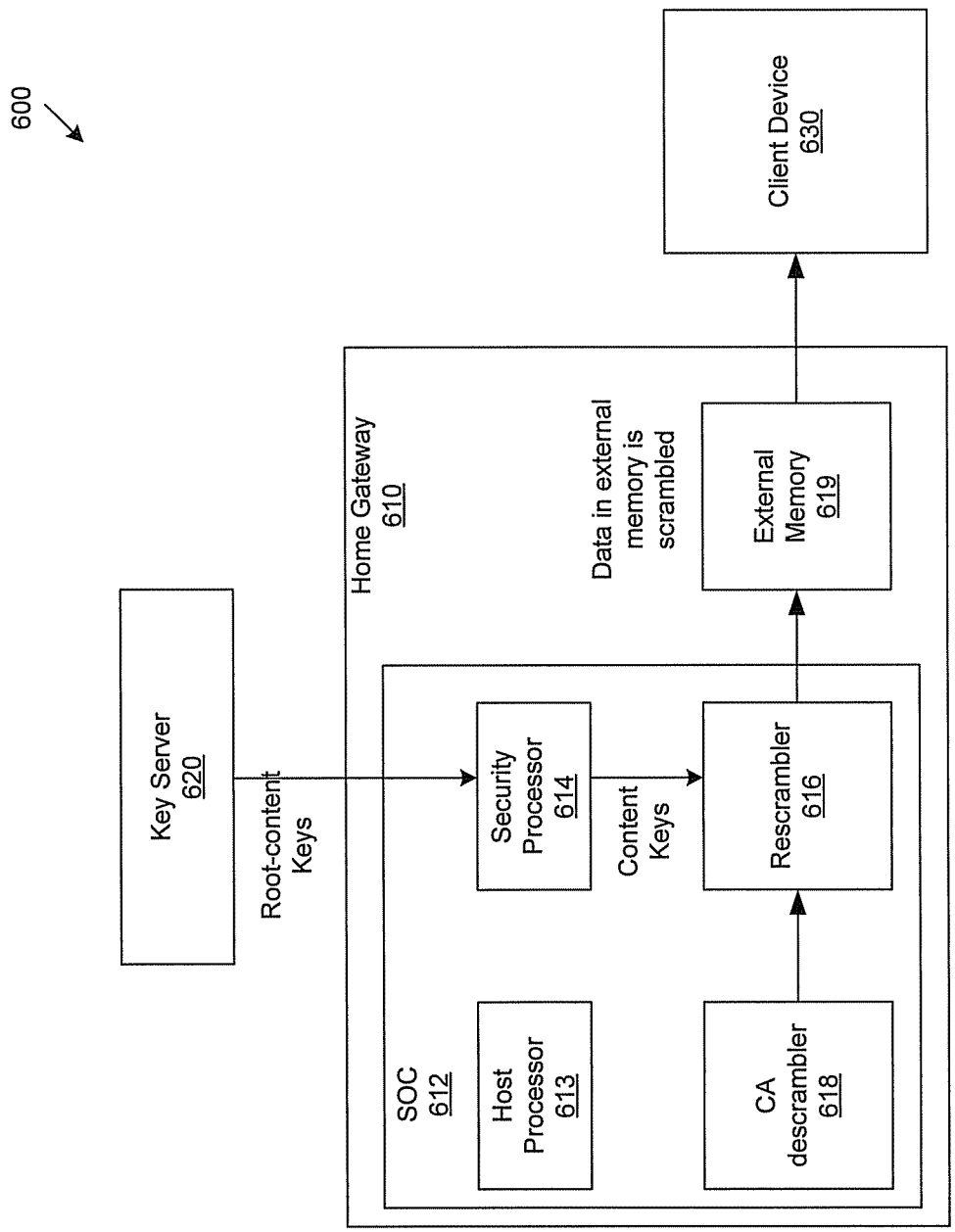
FIG. 6 is a block diagram illustrating an exemplary home gateway that performs content re-scrambling to secure communication in an IP content streaming system, in accordance with an embodiment of the invention.

FIG. 6 is a block diagram illustrating an exemplary home gateway that performs content re-secrambling to secure communication in an IP content streaming system, in accordance with an embodiment of the invention. Referring to FIG. 6, there is shown a communication system 600 comprising a home gateway 610, a key server 620, and a client device 630. The home gateway 610 may be similar to the home gateway 510 of FIG. 5. The home gateway 610 may comprise a host processor 613, a security processor 614, a rescrambler 616, a conditional access (CA) descrambler 618, and an external memory 619. Depending on implementation of the home gateway 610, one or more components such as the host processor 613, the security processor 614, the rescrambler 616 and the CA descrambler 618 may be integrated into a system on chip (SOC) 612, for example.

In operation, in instances where the home gateway 610 may be required to perform conditional access (CA) content descrambling, then to re-scramble the CA descrambled content in order to provide the newly scrambled content to the client device 630, for example. In an embodiment of invention, the home gateway 610 may be configured to utilize in-line encryption and in-line decryption without exposing the content and keys to the host processor 613. The in-line encryption and the in-line decryption may refer to encryption and decryption that may be performed by an encryption-decryption appliance such as the security processor 511, for example. With in-line decryption, the home gateway 610 may be operable to perform conditional access (CA) content descrambling via the CA descrambler 618 to preserve the content on the SOC 612. The descrambled content may be re-scrambled via the re-scrambler 616 utilizing private keys received from the key server 620. The scrambled content, not the clear content, may be stored into the external memory 619. The security processor 614 may be utilized to manage keys without being handled by the software of the host.

Figure 7:
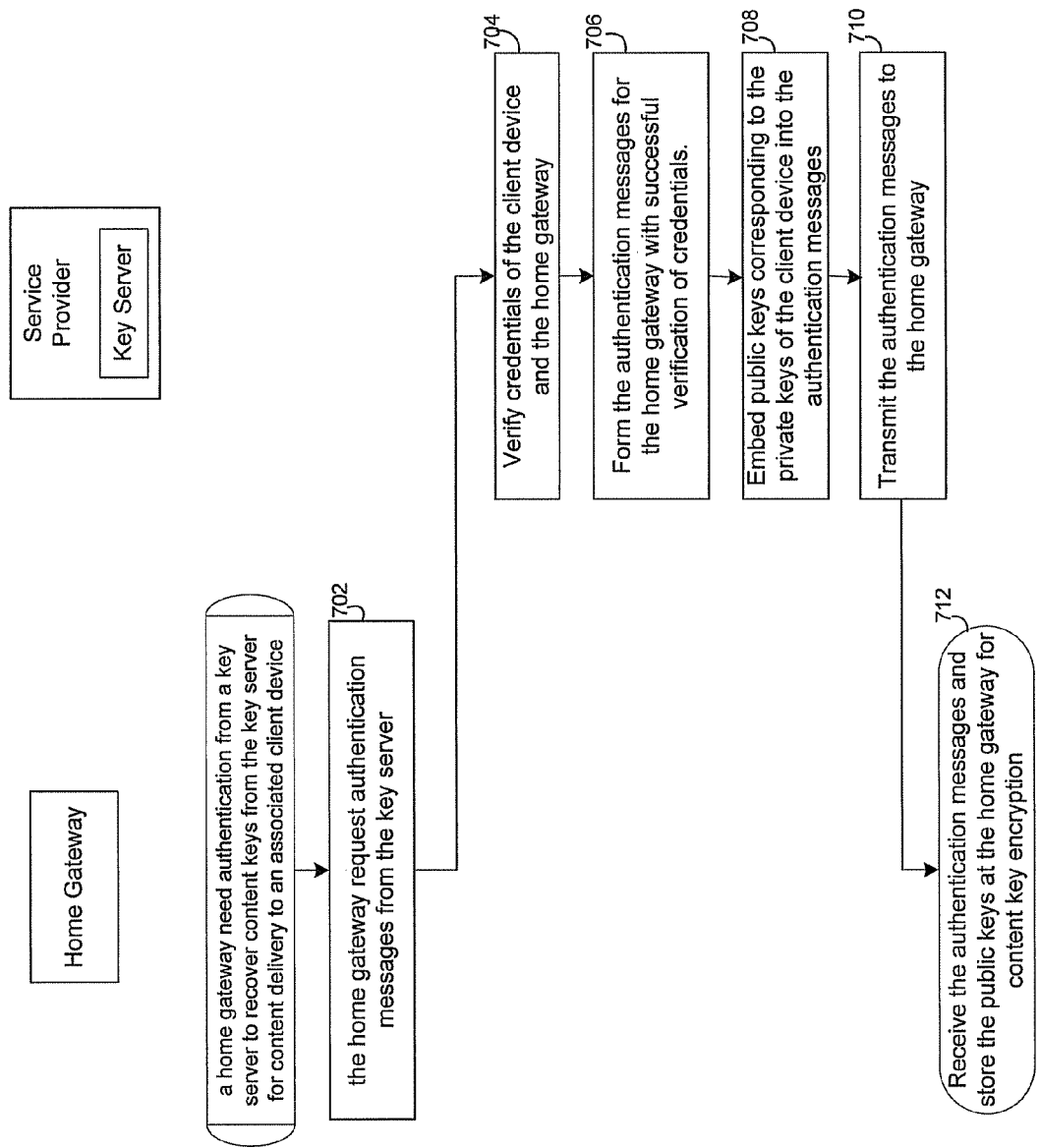
FIG. 7 is a flow chart that illustrates exemplary steps of authentication message request procedure that is performed between a home gateway and a key server, in accordance with an embodiment of the invention.

FIG. 7 is a flow chart that illustrates exemplary steps of authentication message request procedure that is performed between a home gateway and a key server, in accordance with an embodiment of the invention. Referring to FIG. 7, a home gateway 510 need to be authenticated by a key server 520 to allow the home gateway 510 to recover content keys from the key server 520 for content delivery to an associated client device 530. The exemplary steps may start with step 702, where the home gateway 510 may request authentication messages from the key server 520. In step 704, the key server 520 may verify credentials of the client device 530 and the home gateway 510. In an exemplary embodiment of the invention, the key server 520 may verify client identifiers (IDs) to detect or identify whether multiple client devices with the same client ID are requesting authorization. In instances where multiple client devices with the same client ID for the client device 530 are identified or detected, the key server 520 may simply deny the client authorization request, and may inform the home gateway 510 to remove the client devices with the same client ID from the service or network. In step 706, with successful verification of credentials, the key server 520 may be operable to generate or form the authentication messages for the home gateway 510. The authentication messages may comprise information or indication to allow the home gateway 510 to recover content keys from the key server 520. In step 708, the key server 520 may embed public keys or common keys corresponding to the private keys of the client device 530 into the authentication messages. In step 710, the key server 520 may transmit or communicate the authentication messages to the home gateway 510, respectively. In step 712, upon receiving the authentication messages, the home gateway 510 may extract the public keys from the authentication messages and may store the extracted public keys for content key encryption.

Figure 8:
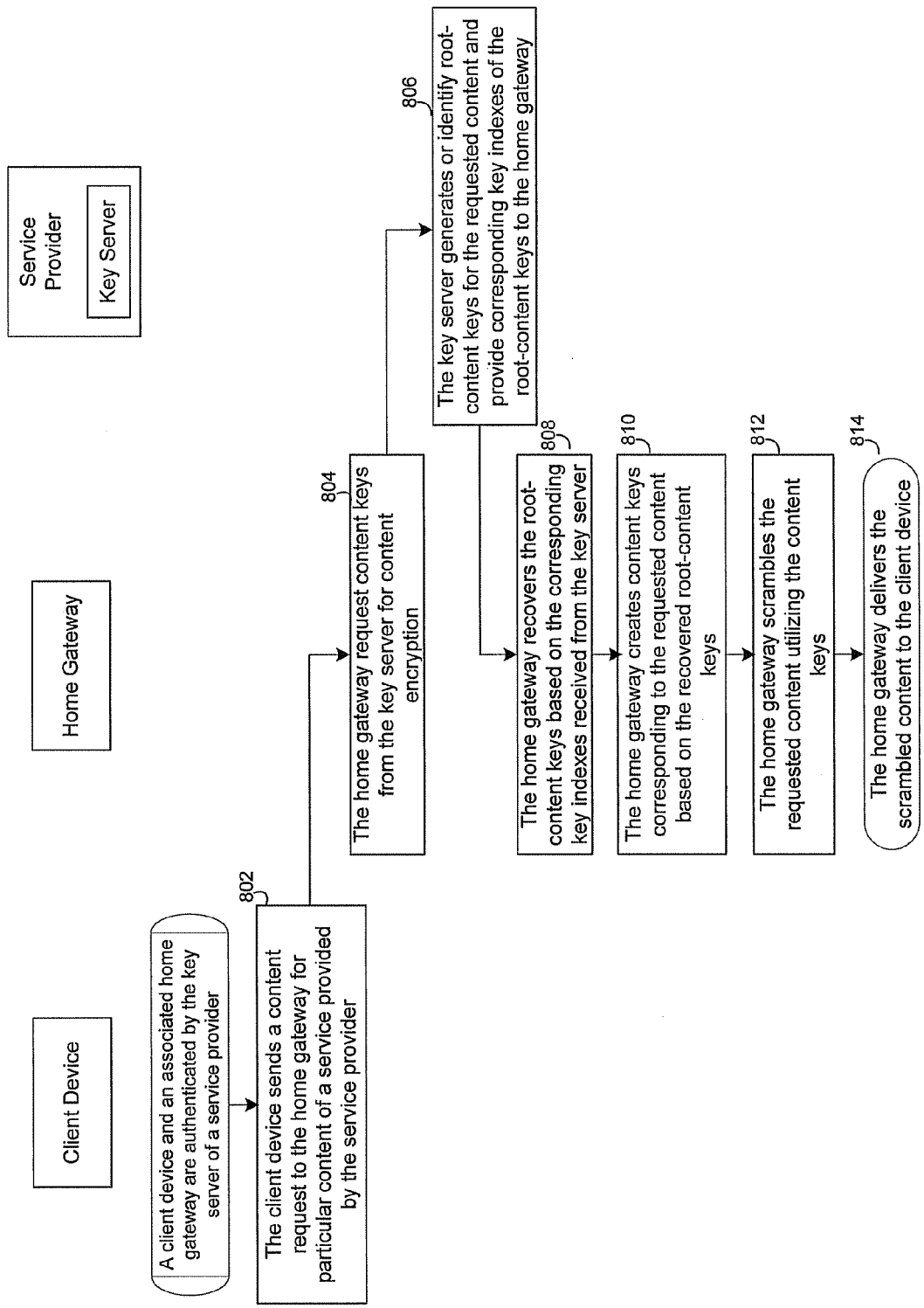
FIG. 8 is a flow chart that illustrates exemplary steps of a content key request procedure that is performed between a home gateway and a key server, in accordance with an embodiment of the invention.

FIG. 8 is a flow chart that illustrates exemplary steps of a content key request procedure that is performed between a home gateway and a key server, in accordance with an embodiment of the invention. Referring to FIG. 8, a client device 530 and an associated home gateway 510 are authenticated by a key server 520 to allow the home gateway 510 to recover content keys from the key server 520 for the client device 530. The exemplary steps may start with step 802, where the client device 530 may send a content request to the home gateway 510 for particular content of a service provided by the service provider 210. In step 804, upon receiving the content request from the client device 530, the home gateway 510 may request content keys from the key server 520 for content protection. In step 806, the key server 520 may generate or identify root-content keys for the requested content. The key server 520 may identify corresponding key indexes for the generated root-content keys utilizing the embedded key table 522. The key server 520 may provide the identified key indexes of the generated root-content keys to the home gateway 510. In step 808, the home gateway 510 may recover the root-content keys from the embedded key tables based on the key indexes received from the key server 520. In step 810, the home gateway 510 may create content keys based on the recovered root-content keys. In step 812, the home gateway 510 may utilize the content keys to scramble the content requested by the client device 530. In step 814, the home gateway 510 may deliver or communicate the scrambled content to the client device 530.

Figure 9:
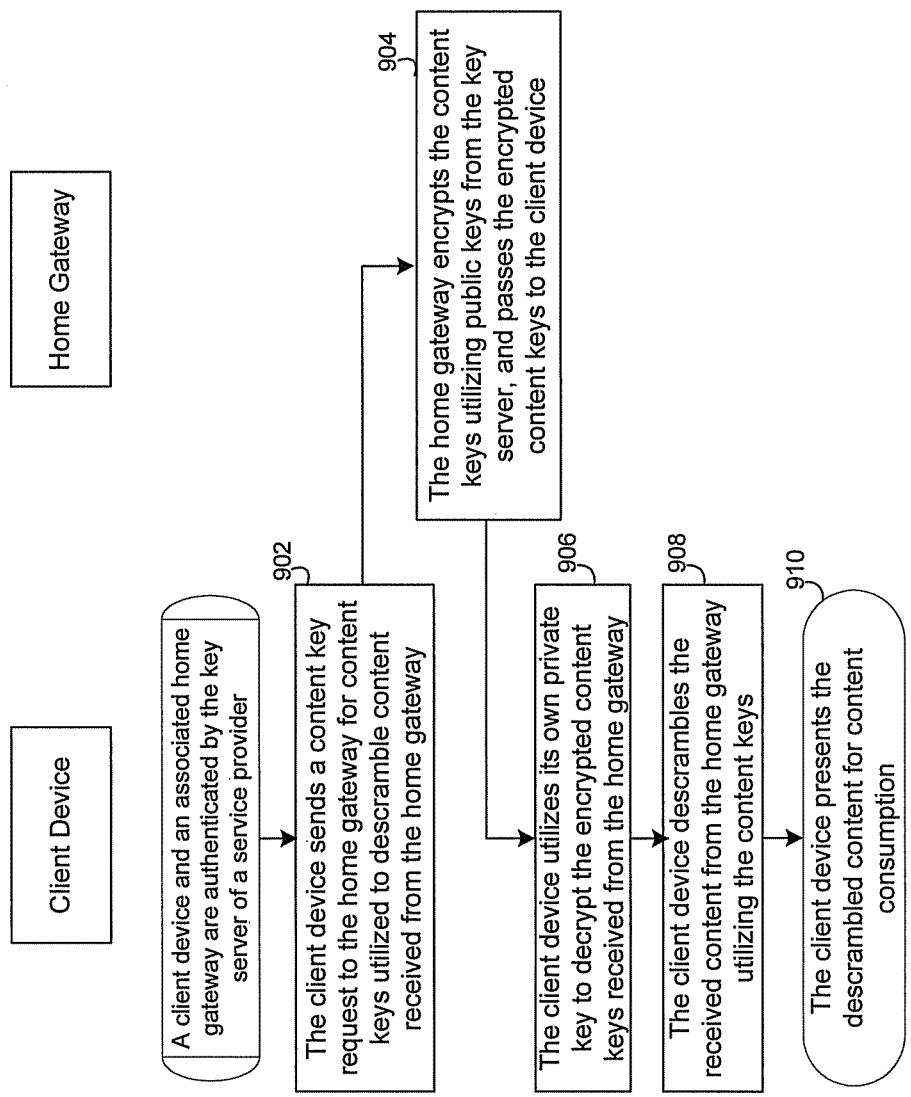
FIG. 9 is a flow chart that illustrates exemplary steps of a content key request procedure that is performed between a home gateway and a client device, in accordance with an embodiment of the invention.

FIG. 9 is a flow chart that illustrates exemplary steps of a content key request procedure that is performed between a home gateway and a client device, in accordance with an embodiment of the invention. Referring to FIG. 9, a client device 530 and an associated home gateway 510 are authenticated by a key server 520 to allow the client device 530 and the home gateway 510 to recover content keys from the key server 520. The exemplary steps may start with step 902, where the client device 530 may send a content key request to the home gateway for content keys that may be utilized to descramble content received from the home gateway 510. In step 904, the home gateway 510 may encrypt the content keys utilizing public keys from the key server 520. The home gateway 510 may communicate or pass the encrypted content keys to the client device 530. In step 906, the client device 530 may recover the content keys by decrypting the encrypted content keys from the home gateway 510 utilizing its own private key. In step 908, the client device 530 may descramble the scrambled content from the home gateway 510 utilizing the content keys. In step 910, the client device 530 may present the descrambled content for content consumption.

Figure 10:
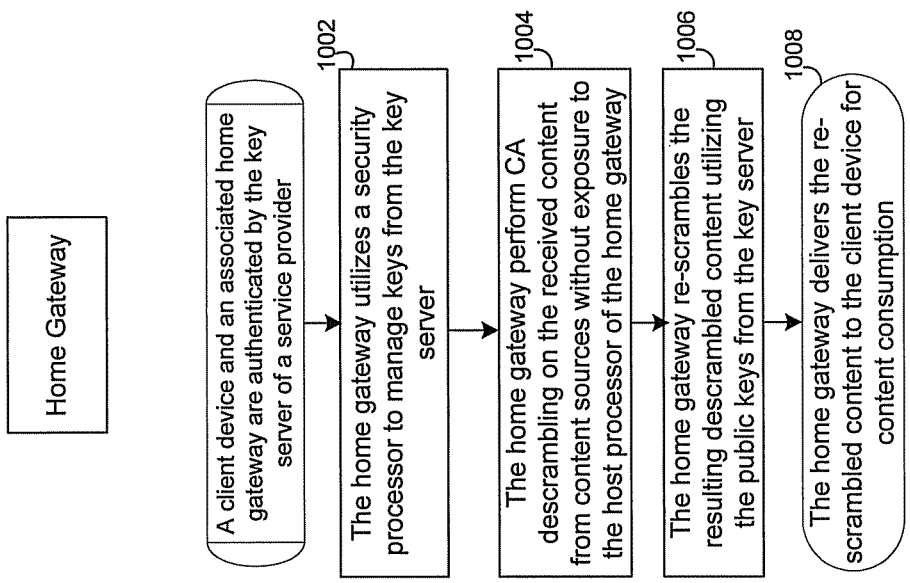
FIG. 10 is a block diagram illustrating an exemplary content re-scrambling performed to secure communication on a home gateway in an IP content streaming system, in accordance with an embodiment of the invention.

FIG. 10 is a block diagram illustrating an exemplary content re-scrambling performed to secure communication on a home gateway in an IP content streaming system, in accordance with an embodiment of the invention. Referring to FIG. 10, a client device 530 and an associated home gateway 510 are authenticated by a key server 520 to allow the client device 530 and the home gateway 510 to recover keys from the key server 520. The exemplary steps may start with step 1002, where the home gateway 510 may utilize a security processor 511 to manage keys from the key server 520. In step 1004, the home gateway 510 may be required to perform conditional access (CA) descrambling on the content from content sources such as the multimedia source 130a without exposure to the host processor 518 of the home gateway 510. In step 1006, the home gateway 510 may be configured to re-scramble the resulting descrambled content utilizing a public key from the key server 520. In step 1008, the home gateway 510 may deliver or communicate the re-scrambled content to the client device 530 for content consumption.

Various embodiments of the invention may comprise a method and system for securing communication on a home gateway in an IP content streaming system. In an exemplary embodiment of the invention, a home gateway 510, for example, enables communication with a plurality of client devices 114a in the home network 110a. The home gateway 510 may be operable to recover a root-content key from a key server 520 of a service provider 130 to secure the delivery of the content requested by one of the client devices 114a such as the client device 530. In this regard, the home gateway 510 may utilize the recovered root-content key to generate or create a content key corresponding to the requested content, via a security processor 511. The security processor 511 may provide the generated content key to the scrambler 516. The scrambler 516 may perform content scrambling on the content from the content processor 350 utilizing the generated content key. The home gateway 510 may communicate the scrambled content to the client device 530 via the home network interfacing subsystem 320 for content consumption. In various embodiments of the invention, the home gateway 510 may request the root-content key from the key server 520 utilize a signed key exchange protocol such as the RSA protocol. The key server 520 may generate the root-content key and pass the key index of the generated root-content key to the home gateway 510 over the distribution networks 120. Upon receiving the key index from the key server 520, the security processor 511 of the home gateway 510 may recover the root-content key utilizing the embedded key table 513 according to the received key index. The security processor 511 may be operable to generate the content key based on the recovered root-content key. The generated content key may be encrypted utilizing a public key corresponding to the private key of the client device 530, for example, and the resulting encrypted content key may be communicated to the client device 530 via the home network interfacing subsystem 320. The public key may be obtained by the home gateway 510 through authentication messages received from the key server 520. Depending system configuration, the client device 530 may receive the encrypted content key and/or the public key from the key server 520 in the authentication messages. In an embodiment of the invention, the client device 530 may be operable to recover the content key through the decryption of the encrypted content key from the home gateway 510 utilizing its own private key. The client device 530 may utilize the recovered content key to descramble the scrambled content from the home gateway 510 for content consumption.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for securing communication on a home gateway in an IP content streaming system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, in a home gateway that enables communication with a plurality of devices, said method comprising:
   recovering, by a security processor of said home gateway, a root-content key from a secure memory in said home gateway based on a key index received from a key server of a service provider, wherein said secure memory is inaccessible to a host processor of said home gateway;
   generating, by said security processor of said home gateway, a content key, corresponding to content requested by one of said plurality of devices, utilizing said recovered root-content key;
   scrambling, by said home gateway, said content utilizing said generated content key; and
   communicating, by said home gateway, said scrambled content to said one of said plurality of devices.

2. The method of claim 1, further comprising:
   receiving, by said security processor of said home gateway, said key index from said key server utilizing signed messages exchanged in both directions between said security processor and said key server.

3. The method according to claim 1, further comprising:
   receiving, by said home gateway, a public key corresponding to said one of said plurality of devices from said key server;
   encrypting, by said home gateway, said generated content key utilizing said public key; and
   communicating, by said home gateway, said encrypted content key to said one of said plurality of devices.

4. The method according to claim 3, further comprising:
   receiving, by said home gateway, an authentication message from said key server, wherein said received authentication message comprises said public key.

5. The method according to claim 3, further comprising:
   recovering, by said one of said plurality of devices, said generated content key by decrypting said encrypted content key utilizing a private key corresponding to said one of said plurality of devices.

6. The method according to claim 5, further comprising:
   descrambling, by said one of said plurality of devices, said scrambled content from said home gateway utilizing said recovered content key.

7. A home gateway for communicating with a plurality of devices, said home gateway comprising:
   a secure memory inaccessible to a host processor of said home gateway;
   a security processor coupled to said secure memory, said security processor being configured to:

recover a root-content key from said secure memory based on a key index received from a key server of a service provider for content requested by one of said plurality of devices, and generate a content key corresponding to said requested content utilizing said recovered root-content key;

a scrambler configured to scramble said content utilizing said generated content key; and an interface configured to communicate said scrambled content to said one of said plurality of devices.

8. The home gateway of claim 7, wherein said security processor is further configured to receive said key index from said key server utilizing signed messages exchanged in both directions between said security processor and said key server.

9. The home gateway of claim 7, wherein said security processor is further configured to encrypt said generated content key utilizing a public key corresponding to said one of said plurality of devices; and wherein said interface is further configured to communicate said encrypted content key to said one of said plurality of devices.

10. A home gateway for communicating with a plurality of devices, said home gateway comprising:

an interface configured to:

receive scrambled multimedia content from a multimedia source, and receive a public key of a client device and a root-content key index from a key server of a service provider, a secure memory inaccessible to a host processor of said home gateway, and a security processor coupled to said secure memory, said security processor being configured to:

generate a content key from said secure memory based on said root-content key index, descramble said received scrambled multimedia content using said generated content key, and re-scramble said descrambled multimedia content using said public key of said client device.

11. The home gateway of claim 10, wherein said secure memory stores said descrambled multimedia content.

12. The home gateway of claim 10, further comprising:

an embedded key table configured to store a root-content key corresponding to said root-content key index, and wherein said secure memory stores said embedded key table.

13. The home gateway of claim 10, wherein said interface is further configured to communicate said re-scrambled multimedia content to said client device.

14. The home gateway of claim 10, wherein said interface is configured to receive said scrambled multimedia content as part of a secure Internet Protocol (IP) content streaming system.

* * * * *